(12) United States Patent
Metzler et al.

(10) Patent No.: US 10,060,739 B2
(45) Date of Patent: Aug. 28, 2018

(54) METHOD FOR DETERMINING A POSITION AND ORIENTATION OFFSET OF A GEODETIC SURVEYING DEVICE AND SUCH A SURVEYING DEVICE

(71) Applicant: LEICA GEOSYSTEMS AG, Heerbrugg (CH)

(72) Inventors: Bernhard Metzler, Flurhofstrasse (AT); Stefan Martin Benjamin Gächter Toya, St. Gallen (CH)

(73) Assignee: LEICA GEOSYSTEMS AG, Heerbrugg (CH)

(*) Notice: Subject to any disclaimer, the term of this patent is extended or adjusted under 35 U.S.C. 154(b) by 248 days.

(21) Appl. No.: 14/963,158

(22) Filed: Dec. 8, 2015

(65) Prior Publication Data
US 2016/0187130 A1    Jun. 30, 2016

(30) Foreign Application Priority Data
Dec. 19, 2014   (EP) .................................. 14199215

(51) Int. Cl.
| | |
|---|---|
| G06K 9/00 | (2006.01) |
| G01C 1/04 | (2006.01) |
| G01C 11/02 | (2006.01) |
| G01C 15/00 | (2006.01) |
| G01C 3/08 | (2006.01) |

(Continued)

(52) U.S. Cl.
CPC .................. *G01C 1/04* (2013.01); *G01C 3/08* (2013.01); *G01C 11/02* (2013.01); *G01C 11/04* (2013.01); *G01C 15/002* (2013.01); *G06K 9/46* (2013.01); *G06K 9/6201* (2013.01); *G06T 7/70* (2017.01); *H04N 5/23238* (2013.01); *G06T 2207/30181* (2013.01)

(58) Field of Classification Search
CPC ...... G01C 11/02; G01C 11/04; G01C 15/002; G01C 1/04; G01C 3/08; G06K 9/46; G06K 9/6201; G06T 2207/30181; G06T 7/70; H04N 5/23238
See application file for complete search history.

(56) References Cited

U.S. PATENT DOCUMENTS

| | | | |
|---|---|---|---|
| 7,218,384 B2 | 5/2007 | Shirai et al. | |
| 8,077,913 B2 | 12/2011 | Euler | |

(Continued)

FOREIGN PATENT DOCUMENTS

| | | |
|---|---|---|
| CN | 103477187 A | 12/2013 |
| DE | 103 08 525 A1 | 9/2003 |

(Continued)

OTHER PUBLICATIONS

European Search Report dated Jun. 26, 2015 as received in Application No. 14199215.6.

*Primary Examiner* — Nirav G Patel
(74) *Attorney, Agent, or Firm* — Maschoff Brennan

(57) ABSTRACT

Method for precisely determining the position offset and orientation offset of a second deployment relative to a first deployment in the same measurement environment of a geodetic surveying device, in particular a total station or a theodolite, on the basis of directions, determined on the basis of the image, and at least one distance, measured by laser-optical means, to measurement environment points, which are imaged both in a second and in a first environment image.

25 Claims, 8 Drawing Sheets

(51) Int. Cl.
  *G01C 11/04*   (2006.01)
  *G06K 9/46*    (2006.01)
  *G06K 9/62*    (2006.01)
  *H04N 5/232*   (2006.01)
  *G06T 7/70*    (2017.01)

(56) References Cited

U.S. PATENT DOCUMENTS

| | | |
|---|---|---|
| 9,046,361 B2 | 6/2015 | Nindl et al. |
| 9,758,239 B2 | 9/2017 | Metzler et al. |
| 9,772,185 B2 | 9/2017 | Metzler |
| 2002/0126895 A1 | 9/2002 | Satoh |
| 2013/0243250 A1* | 9/2013 | France .................. G01C 15/00 382/103 |
| 2014/0163775 A1 | 6/2014 | Metzler |
| 2015/0029489 A1 | 1/2015 | Metzler et al. |

FOREIGN PATENT DOCUMENTS

| | | |
|---|---|---|
| EP | 1 517 116 A1 | 3/2005 |
| EP | 2511781 A1 | 10/2012 |
| EP | 2 620 746 A1 | 7/2013 |
| EP | 2 821 750 A1 | 1/2015 |
| EP | 2 591 314 B1 | 4/2015 |

\* cited by examiner

METHOD FOR DETERMINING A POSITION AND ORIENTATION OFFSET OF A GEODETIC SURVEYING DEVICE AND SUCH A SURVEYING DEVICE

FIELD OF THE INVENTION

The invention relates to a method for precisely determining a position and orientation offset for a geodetic surveying device.

BACKGROUND

For the purposes of recording properties of defined points in a measurement environment, in particular data with a spatial reference, a multiplicity of measurement methods have been known since antiquity. Here, the position and alignment of a surveying device and direction, distance and angle to measurement points are recorded as spatial standard data. The theodolite or a total station constitutes a well-known example of such surveying devices or geodetic devices. Such devices have an angle measurement function and rangefinding function for determining direction and distance to a selected target. In the process, the angle and distance variables are established in the internal reference system of the device. For the purposes of determining the absolute position, these variables still need to be linked with an external, absolute reference system, for the purposes of which the precise absolute deployment of the surveying device, as the position and orientation of the internal reference system thereof in the external reference system, generally serves as a basis.

In order to precisely establish the absolute, i.e. geo-referenced, deployment of the surveying device, the position and orientation thereof can be calculated precisely, as indirect geo-referencing, from geodetic measurements in the current deployment in relation to absolutely referenced target points. Geodetic measurements are direction and distance measurements by means of the angle measurement and rangefinding functions of the surveying device and the target points are punctiform stationary and calibrated points, e.g. church tower tips or objects specifically installed for geodetic surveying, e.g. target markers on a building site, which are present in the measurement environment of the surveying device. The position and orientation are calculated from the measured location relative to the internal reference system of at least three target points and the known absolute location thereof. In other words, the transformation between the two reference systems is determined from the location of the target points in the internal reference system of the surveying device and in the external reference system. A disadvantage of such a method is that the required geodetic measurements to a plurality of target points distributed in the environment are time-consuming and cost intensive.

According to the prior art, labor-intensive and time-consuming methods are required for determining the current deployment, even for measurements that recur in the same measurement environment and are connected with a disassembly and a new setup or displacement of the assembled surveying device. By way of example, if setting out and centering is undertaken without much time outlay for setting up the surveying device exactly above a previous deployment, there is an offset in such situations between the previous, first deployment, i.e. the position and orientation at the earlier location, and the current, second deployment, i.e. the current position and orientation of the surveying device. Such recurring measurements in the same measurement environment from similar locations and with, in the process, a different deployment occur, for example, on building sites for surveying object points newly built since the last survey or a plurality of measurements occur with an offset of the surveying device so as to be able to completely register extended environmental objects, e.g. surveying all four sides of a house or registering object positions, e.g. a street, which are covered, for example by a building or a rocky ledge, as seen from one location.

Direct geo-referencing as an alternative method for determining the current deployment by means of a GNSS receiver connected thereto supplies less precise results and moreover it is disadvantageous in that the method is bound to the reception of GNSS signals, which may be inhibited, e.g. in tunnels or densely built-up areas.

SUMMARY

Some embodiments of the present invention include providing an alternative and simplified method for precisely determining the position and orientation offset of a current, second deployment in relation to a previous, first deployment of a geodetic surveying device.

Some embodiments of the present invention include enabling a fully automated precise determination of such a position and orientation offset which can be carried out quickly.

Some Embodiments of the present invention include enabling a determination of such a position and orientation offset without using a further geodetic device and without using position-providing signals.

Some Embodiments of the present invention include referencing measurement environment points of the same measurement environment, which are surveyed from different deployments in the measurement environment, in relation to one of the deployments.

Some embodiments of the present invention include enabling the precise determination of the current, second deployment of a geodetic surveying device in an external, in particular geo-referenced, reference system on the basis of a previous, first deployment.

Some embodiments of the present invention include providing a geodetic surveying device for such a method.

The present invention relates to a method for precisely determining the position and orientation offset of a second deployment of a geodetic surveying device in relation to a first deployment, with both deployments being situated in the same measurement environment. Within the scope of the method, a second image of the environment of at least one second contiguous region of the measurement environment is recorded from the second deployment. Image elements of the second image of the environment are matched to corresponding image elements of a first image of the environment, which was recorded from the first deployment and which images at least one first contiguous region of the measurement environment, with the first and the second contiguous regions having a multiplicity of common measurement environment points. Directions in relation to measurement environment points, which correspond to corresponding image elements, are determined in the internal reference system of the geodetic surveying device, respectively from the first and second deployment, on the basis of the location of the respective image element in the respective image. A position and orientation offset which is not to scale, i.e. an offset which does not yet correspond to the real dimensions of the measurement environment, is establishable from the determined directions. Determining the scaling factor, i.e. the imaging scale, is implemented, for example, by virtue of the distance from the second deployment to at least one measurement environment point whose direction has been determined being measured in a precise, contactless, preferably laser optical manner or by virtue of an object of the measurement environment with a known dimension, e.g. a scale bar or a measurement path of the known length, which is imaged in the—preferably second— image of the environment, being used. Precisely determining the position and orientation offset is implemented on the basis of the determined directions from the first and second deployments to measurement environment points, which correspond to corresponding image elements, and on the basis of the determined scaling factor.

The present invention likewise relates to a geodetic surveying device for carrying out the method according to the invention. The geodetic surveying device has a control and evaluation unit which is embodied to carry out the method according to the invention. The geodetic surveying device moreover has a structure, arranged on a base, swivelable about a swivel axis. Furthermore, the geodetic surveying device has a sighting unit with a unit for emitting a laser beam and a laser rangefinding functionality, on the basis of which the distance to a point of the measurement environment is measurable by laser optical means. Moreover, the geodetic surveying device has an angle measurement functionality for precisely registering at least one swivel angle defined by a relative swivel position of the structure in relation to the base, on the basis of which the direction to a measurement environment point is measurable. A measurement environment point is understood to mean a small, punctiform portion of the surface of an object (a building, a region on the ground, etc.) in the environment of the geodetic surveying device. Furthermore, the geodetic surveying device has a unit for recording images of the environment, in particular a digital camera or a laser scanning module. In preferred embodiments, the geodetic surveying device is a total station or a theodolite.

Measuring directions and distances is implemented in relation to an internal reference system of the geodetic surveying device. A deployment is to be understood to mean a fixed location and a fixed alignment of the geodetic surveying device, which can be ascribed a position and orientation in relation to an external reference system. In other words, both the location of the zero point or origin and the directions of the coordinate axes of the internal reference system are determinable in the external reference system in the respective deployment.

Different first and second deployments emerge from an offset or displacement of the geodetic surveying device within the same measurement environment and hence from an offset or displacement of the origin of the internal reference system, and/or from change in the alignment thereof. This causes a position offset and/or an orientation offset between the two deployments and is mathematically describable by way of a transformation consisting of a translation and/or rotation. This position offset and orientation offset or the parameters of the translation are determined by way of the method according to the invention, preferably in relation to all six degrees of freedom (three position/translation degrees of freedom and three orientation/rotation degrees of freedom). Optionally, the determined position/orientation offset or the transformation parameter is used to determine the second position and the second orientation, which define the second deployment, relative to a first position and orientation, which define the first deployment.

If the first deployment is determined in relation to an external reference system, there therefore also is, at least implicitly, a determination of the second deployment in relation to the external reference system. In particular, if the first deployment is geo-referenced by reference to a geodetic, absolute reference system for referencing, e.g. the International or European Terrestrial Reference System 1989 (ITRS89/ETRS89) with a Universal Transverse Mercator (UTM) projection, the World Geodetic System 84 (WGS84) or the Gauss-Kürger System, then the second deployment is also, at least implicitly, geo-referenced. Determining the position/orientation offset or the transformation parameters or the second deployment can, in the process, generally only be implemented implicitly to the extent that this information is used to determine one of the two other items of information therewith (e.g. the second deployment from the position/orientation offset). If no explicit knowledge of any of the aforementioned items of information is required per se for a surveying object with the geodetic surveying device, the determination is optionally implicit to the extent that this information is used to determine the location of measurement environment points, which are surveyed from the second deployment, in relation to the first deployment or the absolute, external reference system. In other words, in this case, there is surveying from the second deployment in respect of determining the position of measurement environment points from knowledge about the position and orientation offset in such a way as if the surveying were carried out from the first deployment.

A second image of the environment is recorded from the second deployment to determine the position and orientation offset between the second deployment and the first deployment. The image of the environment is recorded by the unit for recording images of the environment, which is comprised by the geodetic surveying device, e.g. a digital camera with a position-sensitive detector, e.g. a CMOS sensor or CCD sensor, or a unit for creating images of the environment with depth information, e.g. a range imaging camera (RIM), a stereo camera or a laser scanning module, with the laser scanning module optionally being embodied to register the reflected laser light intensity. By way of example, a geodetic surveying device having a laser scanning module is described, e.g., in EP 12153163, filed on 30 Jan. 2012 by the same applicant. Accordingly, an image of the environment is e.g. a digital photograph, a range image or a 3D laser scan.

The second image of the environment, and likewise the first image of the environment, each image a second and first, respectively, contiguous region of the measurement environment. Ideally, a large contiguous region of the environment is registered, for example corresponding to a recording angle range of at least 70°, in particular between 90° and 270°, specifically of at least 130° in an at least largely horizontal alignment (in relation to the external reference system) with a defined vertical aperture angle, the value of which for example lies in the value range from −90° to +90°, in particular between −50° and +50°. Preferably, the whole environment of the location of the geodetic surveying device is recorded, i.e. there preferably is an optionally multi-step recording of an image of the environment over a horizontal angle range of 360° with a vertical aperture angle of e.g. 60°, as a result of which a panorama image or a range panorama image or a 360° 3D scan is generated. This is preferably implemented automatically, for the purposes of which the geodetic surveying device has a motor for rotation of the, by means of which the unit for recording images of the environment can be rotated about a horizontal axis. An image of the environment may consist of a combination of a plurality of individual images, which each depict a different contiguous region of the environment. By way of example, four recordings offset by 90° in the horizontal direction, each with a recording range of 90°, can be combined to form a panorama image as second image of the environment.

However, according to the invention, one contiguous region of the environment, which corresponds to a single image recording with the technical capabilities of a commercially available digital camera, is also sufficient; that is to say, in general, with a viewing angle of approximately 47°. Relatively small portions of the environment are generated, for example, when using a digital photograph with a viewing angle of 12°, in the case of a one-dimensional complete (360°) laser scan in only one at least largely horizontal plane (in relation to the external reference system) or in the case of a recording with a viewing angle of 1.5°, as can be produced by e.g. a telescope camera or on-axis camera of a geodetic surveying device. Such a small region of the environment may suffice in respect of precisely determining the position and orientation offset, depending on the environment, image type and degree of detail of the image.

As described further above, the surveying device is offset within the same measurement environment. Accordingly, at least partly the same parts of the environment as in the first deployment are registrable by the unit for recording an image of the environment in the second deployment. Recording the second image of the environment is brought about in such a way that the second image of the environment images at least one of the parts of the environment which is also imaged in the first image of the environment such that the second and the first contiguous regions of the measurement environment have a multiplicity of common measurement environment points. In other words, at least partly equal punctiform portions of the surface of objects in the measurement environment (of a building, a floor region, etc.) are registered in both images of the environment, wherein equality does not need to mean absolute congruence of the punctiform portions but rather a correspondence of the registered portions within the scope of the resolution capability of e.g. the digital camera or the laser scanning module.

A majority of the measurement environment is registered by recording a panorama image or range panorama image or 360° 3D scan/panorama scan as second and/or first image of the environment in the case of a vertical aperture angle of e.g. 90°, which is why a first and a second image of the environment with a multiplicity of common measurement environment points are generally produced particularly easily in this manner. A targeted specification of the contiguous region of the environment is at most only required to the extent that an approximate horizontal alignment of the unit for recording an image of the environment (or of the geodetic surveying device) and/or setting of the geodetic surveying device to a specific approximate height over the ground are required.

Further targeted specification of the second and/or first contiguous region and corresponding alignment of the unit for recording the image of the environment are optionally implemented prior to the recording of the image of the environment, in particular for recording images of the environment with a relatively small field of view of the unit for recording an image of the environment, or after recording by virtue of a specific region being selected from the image of the environment. Such targeted specification is implemented automatically according to the invention. Here, in particular, the second contiguous region is adapted to the first contiguous region or specified in a targeted manner from knowledge about the first contiguous region. Here, optionally, approximate position and orientation information is determined of the current, second deployment, for example by sensors on the geodetic surveying device such as inclination sensors, GNSS sensors, by way of a mobile radio receiver of the geodetic surveying device or by means of an image-based, comparative method using position and orientation referenced images of environments, as is described, for example, in the application EP 13175115.8, filed on 4 Jul. 2013 by the same applicant. The first contiguous region is identified on the basis of the approximate position and orientation and on the basis of the information stored in the geodetic surveying device, preferably the first image of the environment linked to the approximate position. On the basis of the location of the first contiguous region, known approximately by way of the approximate position and orientation information, or on the basis of prominent points in the environment in the first region relative to the current, second deployment there is automatically a targeted specification and recording of the second contiguous region for the subsequent precise determination of the position and orientation offset by means of the first image of the environment and the second image of the environment recorded in a targeted manner in such a way.

In order to achieve a sufficient correspondence between measurement environment points or in order to achieve a multiplicity of common measurement environment points, measurement environment points recorded in the images of the environment optionally cover the respective recorded contiguous region with a predetermined minimum density. A minimum density, with which the recorded measurement environment points cover the region of the environment, is predetermined when using a digital camera, for example by the number of pixels of the image sensor which, in the case of an image sensor area of typically 5.76 mm×4.29 mm, is e.g. between 0.5 megapixel and 16 megapixels, in particular between 2 megapixels and 8 megapixels. When using a laser scanning module, the minimum density corresponds to the grating density and, for example, lies at a point spacing of between 500 mm and 0.5 mm in the case of a 10 m distance to the location, in particular between 100 mm and 2 mm in the case of a 10 m distance to the location, specifically between 50 mm and 5 mm the case of a 10 m distance to the location.

In the case of a photograph as an image of the environment, said photograph is a black/white recording, a color photograph with a color depth of e.g. 24 bit or a recording over a restricted spectral range. Alternatively, an image of the environment consists of a 3D point cloud or distance measurements related to one another, in particular arranged in a geometric manner, with recording and assignment of textures optionally taking place. Alternatively, two-dimensional camera images with slightly offset recording alignment are used to generate a 3D image, e.g. by means of semi-global matching, and/or a two-dimensional arrangement of distance measurements and hence a type of three-dimensional image of the registered field of view. Optionally, brightness and distance are recorded for each image point such that precisely these brightness values and distances are available for each item of image information, which for example consists of the location of an image point. As a further option, there is an arrangement of a distance measurement relative to other distance measurements, and so it is possible to dispense with knowledge about the location of each image point in respect of the recording location. As a result of this, it is possible, for example, to dispense with a complete evaluation of the registered visual region such that higher processing speeds can be realized, e.g. using sub-windowing or sub-framing.

In a further step of the method according to the invention, image elements of the second image of the environment are matched to corresponding image elements of the first image of the environment. In other words, there is an association between mutually corresponding image elements. In particular, image elements correspond to one another when they are images of the same measurement environment point. The image elements are the "raw data" of the respective image of the environment, i.e. individual pixels or points in the 3D point cloud or of the 3D image (optionally also sub-pixel elements or intermediate points), wherein, for the purposes of matching, e.g. the color values or relative brightness values thereof and the location in the image thereof are used and matching is brought about on the basis of all pixels or points in an image or only on the basis of certain pixels or points, e.g. every 16th or 128th pixel or point.

Alternatively or additionally, the image elements are image features ("features"), which are extracted from the images of the environment by means of image processing. During the feature extraction, there generally initially is a search for prominent regions or points in the image ("interest points"), e.g. by means of a Hough transform or an edge-based and/or region-based segmentation, e.g. a Förstner operator, a Harris-Laplace detector and/or a maximally stable extremal regions (MSER) detector. Then, the found regions or points are generally complemented by descriptors. Such extracted image features are e.g. geometric elements (e.g. dominant lines, arc segments or paths) or statistical descriptors such as a histogram of oriented gradients, SIFT, SURF, ORB, BRISK and more. If the image of the environment is three-dimensional, the features or points are likewise distributed in a three-dimensional space and use is made of appropriate methods, as are based e.g. on a Hough transform, geometric forms, descriptors, spin images and NARF (normal aligned radial features). Alternatively, the features or points can be projected onto a plane, for example a horizontal plane. In terms of the method, use is made of position and/or size of the image features in the image of the environment, the relative locations in relation to one another, a two-dimensional or three-dimensional pattern formed by such points, lines, areas or bodies, etc. By way of example, a descriptor equivalent to a descriptor of the first or second image of the environment is matched to the descriptor of the respective other image of the environment, optionally taking into account a set threshold.

Matching is brought about manually by assigning corresponding image elements by a user, for example by virtue of the first and second image of the environment being displayed next to one another or superposed on one another on a display of the geodetic surveying device and/or automatically by a matching algorithm. Matching algorithms are known in a large variety, of which the following are listed in a purely exemplary manner: algorithms of the sum of squared differences (SSD), of the normalized cross-correlation (NCC), of the least squares (LSQ), of the iterative closest point (ICP), of the geometric primitive ICP, iterative mean point, dense matching (e.g. semi-global matching (SGM)), K-d tree algorithm, RANSAC, in particular in combination with the scale invariant feature transform (SIFT) or speeded-up robust features (SURF). In particular, matching can be brought about by way of a combination of various approaches, e.g. by means of an algorithm which uses both "raw data" and extracted features, such as e.g. a point-to-plane-ICP algorithm. As a further option, the matching is brought about in stages on the basis of different methods, by virtue of there initially being approximate matching (e.g. matching of corresponding alignments of the two images of the environment ("image alignment") or matching of large-area/large-scale image segments), followed by fine matching (matching of small-area/small-scale image segments or matching of individual pixels/points).

Corresponding image elements correspond to measurement environment points which are present both in the first and the second contiguous region and which are registered in the respective image of the environment from both the first and the second deployment. Thus, directions to such measurement environment points are determinable both in relation to the first position and orientation and in relation to the second position and orientation (i.e. in relation to the internal reference system of the geodetic surveying device in the first deployment and in the second deployment). According to the invention, determining the directions in relation to both positions and orientations is implemented by means of geometric principles on the basis of the location of the respective corresponding image element in the respective image of the environment, which are combinable to form a first bundle of directions relative to the first deployment and a second bundle of directions relative to the second deployment. In the case of a laser scan or a point cloud as an image of the environment, the directions are determined to "corresponding" measurement environment points (i.e. to those measurement environment points which correspond to corresponding image elements) by virtue of there being a selection from the directions in relation to all imaged measurement environment points to such measurement environment points belonging to corresponding image elements, which directions are already available in accordance with the generation procedure of a laser scan or a point cloud. In the case of a photograph as image of the environment, the optical parameters of the camera are taken into account for determining the directions, in particular the location of the projection center relative to the image plane or the location thereof in the internal reference system of the geodetic surveying device. Thus, a respective direction is set by the location of the respective image element in the image of the environment, which is known from the location of the corresponding pixel or pixels on the detector of the digital camera, and the location of the projection center.

If the scaling factor is determined on the basis of a contactless distance measurement, the distance is measured precisely, e.g. by laser optical means or by means of other electromagnetic waves, from the second deployment to at least one of these "corresponding" measurement environment points, to which the directions are determined in the first and the second deployment, respectively in the internal reference system. Thus, there then is the precise determination of the distance of this measurement environment point from the zero point of the internal reference system in the second deployment. The distance is measured by way of the rangefinding functionality of the sighting unit of the geodetic surveying device, with this being unnecessary if a laser scanning module is present since a distance is already determined by laser optical means by way of the laser scan. Nevertheless, there optionally is a distance measurement using the sighting unit for the purposes of increasing the accuracy or reliability. As a further option, the precise measurement of the distance is brought about automatically, with the geodetic surveying device or the sighting unit being aligned automatically to the measurement environment point corresponding to the corresponding image elements. Here, the established direction relative to the second deployment is taken into account.

The position offset and orientation offset between the two deployments is determined precisely by means of geometric principles or algorithms on the basis of the directions to the measurement environment points, which correspond to the corresponding image elements, relative to the first deployment and relative to the second deployment and on the basis of the scaling factor, which, as described above, e.g. emerges from a laser optical distance measurement to at least one of these measurement environment points from one deployment, preferably the current second deployment. A very large number of methods or algorithms suitable herefor are known. By way of example, a 7-point algorithm or 8-point algorithm including the scaling factor, bundle adjustment on the basis of linking points (in particular the corresponding points) and ground control points are suitable for photographic images of the environment. By way of example, solving a Procrustes problem by a singular value decomposition or an ICP algorithm are suitable for three-dimensional images of the environment, preferably in the case of an approximate pre-orientation of the point clouds. Alternatively or additionally, the parameters of the transformation between the first and the second deployment are precisely determined. Optionally, the position offset and orientation offset or the translation parameters are determined so precisely that the second position and the second orientation are determinable with geodetic accuracy. Geodetic accuracy should be understood to mean that the position and orientation information in respect of the second deployment is available so precisely by means of the method according to the invention that a subsequent survey of measurement environment points by means of the laser rangefinding functionality and the angle measurement functionality of the geodetic surveying device can take place with geodetic accuracy, in particular with at least such an accuracy as is enabled by conventional methods for determining the current deployment of a geodetic surveying device. There likewise optionally is an explicit determination of the second position and orientation. In one development of the method, a subsequent geodetic survey of measurement environment points from the second deployment using the geodetic surveying device is carried out in such a way that the position data of a measured measurement environment point are determined relative to the first position and orientation on the basis of the available position offset and orientation offset or the translation parameters. If the first deployment is geo-referenced, the surveyed position data are transformed into the external, absolute reference system as a further alternative or additional option.

In order to increase the precision and/or robustness, at least one further image of the environment of at least one further contiguous region of the measurement environment, which is specified in a targeted manner, is recorded in addition to the first and second image of the environment in one development of the method according to the invention, said further image preferably being recorded with a higher resolution than that of the first and/or second image of the environment. For the purposes of the targeted specification, use is made of image features which are extracted according to the invention from a first and/or second image of the environment, which generally has a relatively low resolution and which was generated with a large recording angle, i.e. an image which images a large-scale contiguous region, such as e.g. a panorama image or 360° 3D scan. According to the invention, one or more small-scale regions of the measurement environment are specified automatically in a targeted manner in this case, proceeding from the extracted feature or features, for example by virtue of a building corner or another prominent measurement environment point being identified as image feature and a small-scale portion of the measurement environment around this prominent point being set as a further small-scale region. A method for automatically searching for prominent measurement environment points in the measurement environment is described, for example, in the patent application EP 2591314 by the same applicant, which was filed on 7 Jul. 2011. The further small-scale region is then recorded in a further image, preferably with a higher resolution or with a high resolution, in a further recording step. By way of example, if the geodetic surveying device has an overview camera and a telescope or on-axis camera, a panorama image is initially recorded by the overview camera as a first and second image of the environment, at least one image feature is extracted therefrom, and at least one small-scale region which is imaged in a further image of the environment with a high resolution in a targeted manner by means of the telescope or on-axis camera is specified on the basis thereof. Further examples include recording a first or second region of the environment using a wide-angle image or wide-angle scan and, building thereon, recording an image or scan (or vice versa) using a small recording or aperture angle. The further method steps according to the invention for determining the position offset and the orientation offset (matching image elements, determining the directions, determining a scaling factor and precisely determining the position offset and orientation offset) are then carried out in a manner analogous to the procedure described above using the further, preferably high resolution image of the environment instead of using the first and second image of the environment.

In a further development of the method according to the invention, quality indicators for calculation and/or measurement results are generated by means of an evaluation. By way of example, such a quality indicator characterizes the uncertainty with which a determination of an approximate position or orientation by means of a sensor, a matching or a determination of translation parameters or position offset or orientation offset is afflicted. By way of example, calculation and/or measurement results are evaluated by weighting pairs of corresponding pixels or 3D points on the basis of an extended Kalman filter (EKF) or weighting by means of the maximum likelihood method or weighted least-squares method, from which the weighting matrix of e.g. a variance covariance matrix (VCM) is derivable. By evaluating or generating a quality indicator, it is possible to increase the reliability and/or accuracy of the method and optionally possible to initiate correction measures by the user or in an automated manner.

An advantage of the method according to the invention lies in the simple performability thereof. The only preliminary work required is the setup and optional leveling of the geodetic surveying device. Steps with great work outlay, such as marking and plumbing and centering can be dispensed with. No further devices are required in addition to the surveying device according to the invention. In contrast to e.g. a method based on geodetic surveys, the method according to the invention does not require subject-specific knowledge. Moreover, a user can be assisted in individual steps by automatic routines.

Moreover, the method according to the invention offers the advantage that all the steps can run in an automated and automatic manner using appropriate hardware and software. To this end, a geodetic surveying device according to the invention is equipped e.g. with a camera or a laser scanning module with a motor controlled in an automated fashion in order to automatically generate an image of the environment therewith and by means of the image recording and image processing algorithms. Matching of image elements and, optionally, the preceding extraction thereof, is performable by means of appropriate image processing and feature extraction algorithms from the prior art, as described above, without requiring user intervention, as is the case for the determination of the directions to "corresponding" measurement environment points by means of geometric algorithms. The sighting unit is automatically alignable to a "corresponding" measurement environment point by means of the automatically controlled motor such that the precise laser optical measurement and—by means of geometric algorithms—the determination of the position offset and orientation offset can take place in an automatic and automated manner. In particular, the method according to the invention offers the advantage that geodetic surveying devices from the prior art require no additional hardware as both a camera or a laser scanning module and a control motor are already available. Hence, no additional production costs arise in this respect.

Thus, the method according to the invention can run partly and, particularly advantageously, overall in a fully automated manner by means of a geodetic surveying device with appropriate control and evaluation algorithms and optionally with motorization, enabling a simple and quick execution.

Except for the direct recording of the second image of the environment, that is to say e.g. the taking of the photograph or the scanning, the method according to the invention furthermore offers the advantage that method steps are not bound to a special device but can be carried out both by the geodetic surveying device and externally by way of a data transmission to external devices, e.g. a cloud server or a smartphone. When external devices are used, the determined position offset and orientation offset or data determined thereabout can be transferred to the geodetic surveying device after completion of the appropriate calculations.

In particular, the method according to the invention offers advantages in a measurement environment to be surveyed over a relatively long period of time. By way of example, this is the case on a building site or in the case of naturally changing environments. The method according to the invention also offers advantages in a measurement environment in which an object is to be surveyed from a plurality of locations, for example the whole surface of an article or surfaces of part of an article which are covered in one view, for example by way of other parts of the article. Then, it is sufficient to set a surveying device location or a first deployment one time, determine the absolute position thereof—should it not yet be available—once using a different method and record a respective image of the environment of the location and optionally store the latter. Surveys from a second or further deployment in the measurement environment are referenceable in relation to the first deployment in a simple manner and with little time expenditure using the method according to the invention such that the measurement data of all surveyed measurement environment points are related to a single, common deployment, i.e. position and alignment, in a manner independent of the actual surveying location. In a particularly advantageous manner, the position data of all measurement environment points surveyed from all deployments are, according to the invention, determined in relation to the absolute reference system by geo-referencing of only a single one of the deployments in one development of the method.

The invention likewise relates to a computer program product, stored on a machine-readable medium, or computer data signal, embodied by an electromagnetic wave, comprising program code suitable to determine the position offset and orientation offset of the geodetic surveying device from a recorded image of the environment of the geodetic surveying device according to the method according to the invention.

BRIEF DESCRIPTION OF THE DRAWINGS

The method according to the invention and the geodetic surveying device according to the invention are described in more detail below in a purely exemplary manner on the basis of exemplary embodiments depicted schematically in the drawing.

In detail.

DETAILED DESCRIPTION

Figure 1:
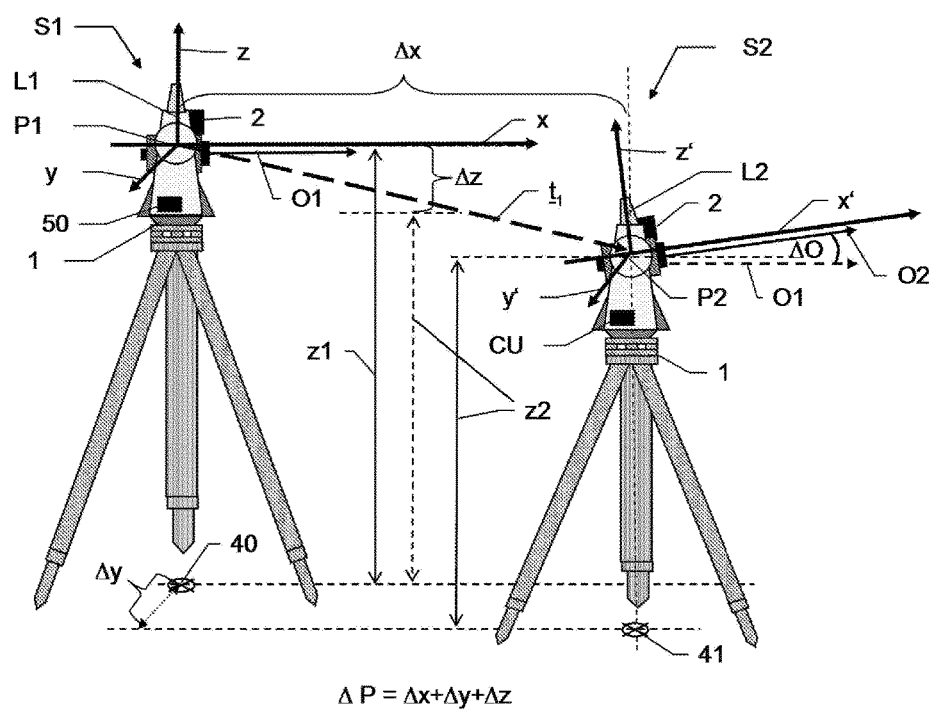
FIG. 1 shows the position offset and orientation offset of a surveying device according to the invention in a first and a second deployment.

FIG. 1 shows, in two different deployments S1 and S2, a total station as an exemplary embodiment of a geodetic surveying device with a control and evaluation unit 50 and with a laser rangefinding functionality and angle measurement functionality. The first deployment S1 is defined by a first position P1 and a first orientation O1, while the second deployment S2 is defined by a second position P2 and a second orientation O2. The first and second positions P1 and P2, respectively, are the locations in an external reference system of the zero point of the internal reference system of the total station and the first and second orientations O1 and O2, respectively, are the orientations of the internal reference system relative to the external reference system. Therefore, the internal reference system of the surveying device forms a first local reference system L1 with the axes x, y, z in the first position P1 with the first orientation O1 and a second local reference system L2 with the axes x', y', z' in the second position P2 with the second orientation O2. Distance and angle measurements by way of the total station are made in relation to the internal reference system thereof, i.e. respectively in relation to the local reference system L1 or L2.

The first and second orientations O1 and O2, respectively, are depicted in the drawing by arrows O1 and O2, respectively, which each correspond to the axis of rotation of a viewing cone of the total station, with the tip of the viewing cone lying in the zero point and coinciding with the alignment of the x-axis or x'-axis. Without loss of generality, the surveying device 1 in FIG. 1 is aligned in such a way in the deployment S1 that the xy-plane is parallel to the plane of the ground while said surveying device is aligned in the second deployment S2 in such a way that the internal reference system is rotated about the y-axis compared to the first deployment S1. In relation to the external reference system, the ground points 40 and 41 constitute the perpendicular projection of the zero point on the ground and, for reasons of simplicity, are used in FIGS. 3a-d and FIG. 5 for denoting the first and second deployment S1 and S2, respectively, in the drawing.

The difference in the first and the second deployment S1 and S2 is expressed in terms of a position offset ΔP, which can be composed of the respective difference Δx, Δy, Δz along the coordinate axes x, y, z and which can be expressed by a translation vector $\underline{t}_1$, and in terms of an orientation offset ΔO, which can be composed of the respective difference of the three direction angles and which can be expressed by a rotation matrix $\underline{R}_{L2}^{L1}$. In order to simplify the illustration, the first and the second orientation O1 and O2 only differ in respect of a single direction angle (rotation about the y-axis) in the example. However, this does not restrict the generality; according to the invention, the orientation offset ΔO is determinable in relation to all three degrees of rotational freedom. The translation vector $\underline{t}_1$ and the rotation matrix $\underline{R}_{L2}^{L1}$ together provide the transformation parameters of the transformation between the first local reference system L1 and the second local reference system L2 or between the first deployment S1 and the second deployment S2.

In practice, transforming or offsetting the surveying device from the first deployment S1 to the second deployment S2 (or vice versa) occurs e.g. for the following reasons: the surveying device 1 is set up for surveying a building at a first location, constituting the first deployment S1. Since it is not possible to survey all sides of the building from the first location, the surveying device 1 is set up in the vicinity at a second location, i.e. a second deployment S2, from which further sides of the building can be surveyed, for further surveying of the building, wherein, according to the invention, the field of views of the surveying device 1 in the first and in the second deployments S1 and S2, respectively, have overlaps. Another practical application example leading to a deployment displacement lies in the repeated surveying on different days, respectively with assembling and disassembling of the surveying device 1, which should in each case occur from a similar location with a similar alignment.

Thus, in general, the second deployment S2 forms the current location of the surveying device 1. Here, conventionally, the first position P1 and first orientation O1 of the earlier first deployment S1 are known precisely by way of a position and orientation determination using a method according to the prior art, e.g. by means of free deployment or indirect geo-referencing of the first deployment S1. In other words, the local reference system L1 is generally geo-referenced.

Position and orientation information (position offset ΔP and orientation offset ΔO or second position and orientation P2 and O2 or translation vector $\underline{t}_1$ and rotation matrix $\underline{R}_{L2}^{L1}$) of the second deployment S2 are now determined precisely using the method according to the invention. Optionally, there is a transformation of the spatial locations of measurement environment points, which are determined in one deployment S1 or S2, to the other deployment S2 or S1 on the basis of the precise position and orientation information.

Figure 2A:
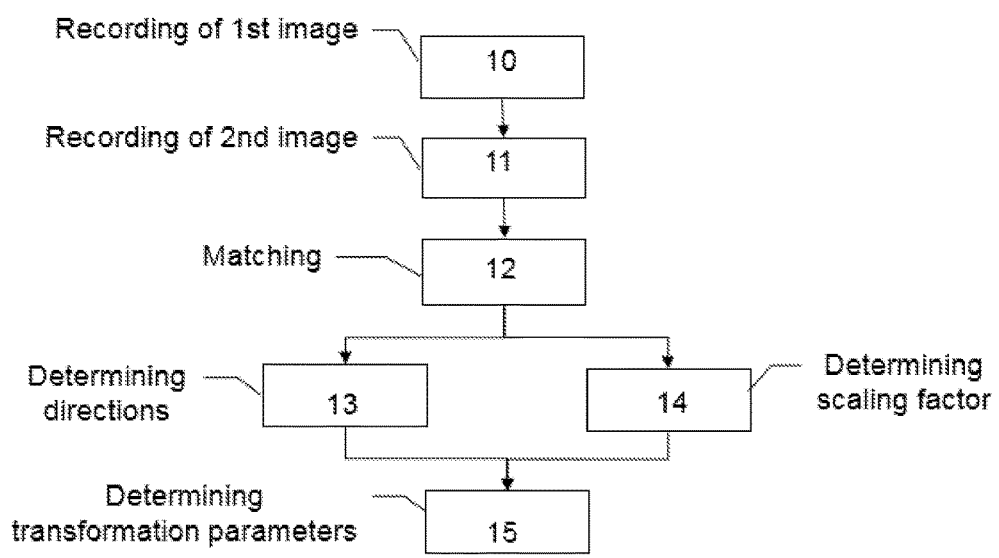
FIGS. 2a and 2b show a schematic example of a sequence according to the invention of the method.

FIG. 2a schematically shows an example of a sequence of the method according to the invention for precisely determining the position offset and orientation offset ΔP and ΔO (or for precisely determining the second position and orientation P2 and O2 or the translation vector $\underline{t}_1$ and the rotation matrix $\underline{R}_{L2}^{L1}$). In a step 10, the first image of the environment is recorded at the first deployment S1. In a step 11, the second image of the environment is recorded at the second deployment S2. Recording is respectively brought about by a unit 2 for recording an image of the environment, e.g. a digital camera with a position-sensitive detector, an RIM camera or a laser scanning module, which is comprised by the surveying device 1 and the location and alignment of which relative to the internal reference system of the surveying device 1 are known. The first image of the environment images at least a first region of the environment of the surveying device 1; the second image of the environment images at least a second region of the measurement environment. Recording is in each case brought about in such a way that both regions in this case have a multiplicity of common measurement environment points such that the first and the second image of the environment at least partly overlap. To this end, the second image of the environment is preferably recorded from the current deployment S2 in a manner analogous to the first image of the environment, for example by virtue of the unit 2 being positioned approximately at the same level in relation to the external reference system and/or by virtue of the same viewing angle dimensions being used as in the first deployment S1. In the case of a surveying device 1 with a digital camera as a unit 2, the image of the environment is a photograph, in the case of an RIM camera or laser scanning module it is a 3D point cloud. In step 12, corresponding image elements in the two images of the environment are matched. Matching is brought about on the basis of the raw data of the images of the environment or, alternatively, on the basis of image features extracted from the raw data, for the purposes of which a method step (not depicted here) is carried out prior thereto, in which method step image features are extracted. In step 13 the directions in relation to measurement environment points, which are imaged in the first and in the second image of the environment by corresponding image elements, are determined in the internal reference system of the surveying device 1. This is respectively carried out for the first position P1 with the first orientation O1 and for the second position P2 with the second orientation O2. Hence, using this, the directions of such measurement environment points are known in relation to the first deployment S1 or the first local reference system L1 and in relation to the second deployment S2 or the second local reference system L2. Moreover, a scaling factor, i.e. the image scale, is determined in a step 14. By way of example, to this end, the distance to at least one of these measurement environment points, the directions of which in relation to the first or second deployment S1 or S2 are determined or determinable, is measured in relation to the second deployment S2 or the second position P2 by laser optical means. If the surveying device 1 has a laser scanning module, step 14 is included in step 10 or step 11 as the distances of the measurement environment points are already determined by laser optical means when generating the 3D point cloud by way of a laser scan. Alternatively or if the unit 2 is embodied as a digital camera or an RIM camera, the distance is determined by means of the laser rangefinding functionality of the surveying device 1 in step 14. As an alternative to a contactless distance measurement, use is made of a measurement environment object with known dimensions. Then, the scaling factor is determined from the ratio between the real dimensions and the dimensions of the image. Finally, in step 15, the transformation parameters (translation vector $\underline{t}_1$ and rotation matrix $\underline{R}_{L2}^{L1}$) between the first local reference system L1 and the second local reference system L2 or the position offset ΔP and the orientation offset ΔO between the first and the second deployment S1 and S2 or the second position and orientation P2 and O2 of the second deployment S2, are determined from the directions and the scaling factor determined in step 13 and step 14.

Figure 2B:
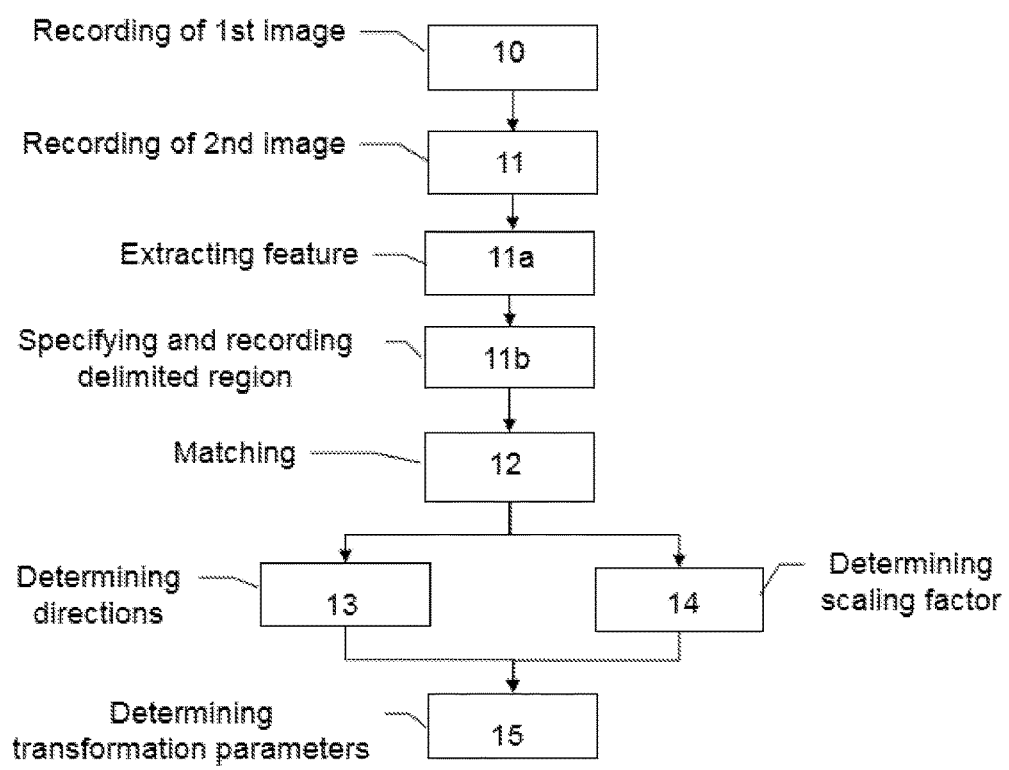

FIG. 2b schematically shows an alternative example of a sequence of the method according to the invention for precisely determining the position offset and orientation offset ΔP and ΔO. Steps 10 and 15 correspond to those of the example according to FIG. 2a; in contrast to the preceding example, steps 11a and 11b are inserted. At least one image feature is extracted from the first and/or second image of the environment by means of an image-processing algorithm in step 11a. Preferably, the first and/or second image of the environment is an image which was recorded with a very large field of view, in particular with a field of view of 360° in the horizontal direction. Image features corresponding to a prominent point in the measurement environment, e.g. a corner or a color boundary, are particularly suitable. A comparatively tightly delimited region of the measurement environment is specified on the basis of the extracted image feature in step 11b and recorded in a further image of the environment. By way of example, the unit 2 for recording an image of the environment is aligned with the prominent point in the measurement environment, which corresponds to the extracted image feature, and the unit 2 is used to record the further image of the environment with a smaller field of view or viewing angle than in the case of the second image of the environment, wherein the measurement environment has a higher resolution in the further image of the environment than in the second image. Alternatively, the geodetic surveying device 1 comprises a further unit 2' for recording an image of the environment with a high resolution and small viewing angle (and hence a small region of the environment) and this unit 2' is used for recording the further image of the environment. In the further method steps 12 to 15, use is made of the further image of the environment as second image of the environment, i.e. it replaces the original second image of the environment and the method steps of matching, determining the direction, determining the scaling factor and determining the position and orientation offset ΔP and ΔO are undertaken using the further image of the environment as second image of the environment.

The method steps are described in more detail in an exemplary manner on the basis of FIGS. 3a to 5.

Figure 3A:
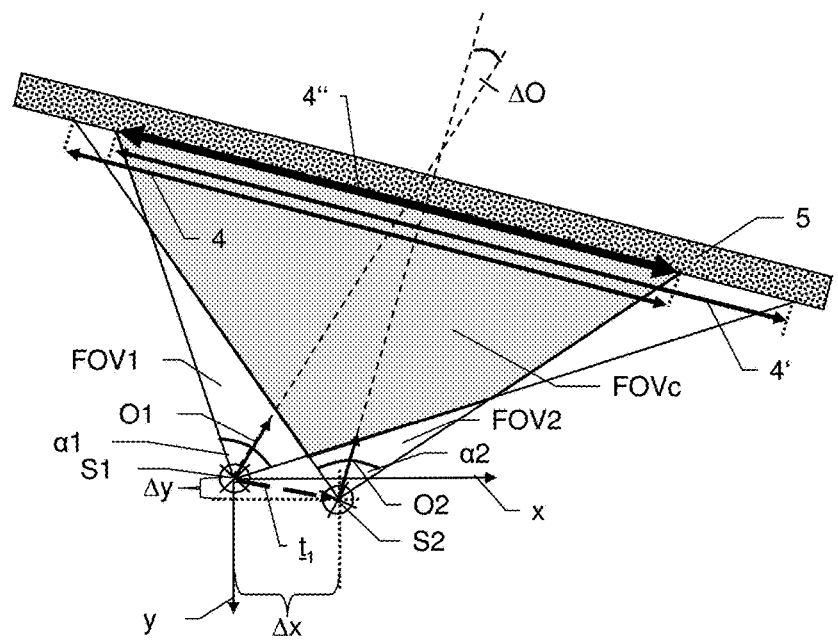
FIGS. 3a-e show examples of recording images of the environment, according to the invention, in a first and a second deployment.

FIG. 3a shows, in a bird's-eye view, a first and a second deployment S1 and S2 as a two-dimensional geometric diagram. The two deployments have a position offset ΔP, which is depicted in the figure by the offset Δx in the x-direction and the offset Δy in the y-direction, and an orientation offset ΔO, which is depicted in the figure by the offset ΔO in the xy-plane. The unit 2 (not depicted here) for recording an image of the environment has a field of view FOV1 and FOV2 in this example, which is characterized by the viewing angle α1 and α2, which is respectively approximately 90° in the example.

In each case, a contiguous region of the measurement environment, from which an image of the environment is recorded, is set by the respective field of view FOV1 or FOV2 (depicted as an intersection of a xy-plane with the 3D viewing cone of the unit 2). In the example, there is a recording (step 10 or 11 from FIGS. 2a and 2b) of a first region (arrow 4) in the first deployment S1 and of a second region (arrow 4') in the second deployment S2, wherein an object 5 (e.g. a building wall) situated in the regions as part of the measurement environment. The first region (arrow 4) and the second region (arrow 4') are not identical due to the different deployments S1 and S2. However, the orientations O1 and O2 are selected in such a way that the field of views FOV1 and FOV2 intersect (depicted in an exemplary manner in the figure by a sectional plane FOVc marked in gray), and so the two regions (arrow 4 and 4') partly cover one another (thick arrow 4"), as a result of which the first region (arrow 4) and the second region (arrow 4') have a multiplicity of common measurement environment points. Hence, a first image of the environment recorded from the first deployment S1 and a second image of the environment recorded from the second deployment S2 partly image the same region (arrow 4") of the measurement environment.

Figure 3B:
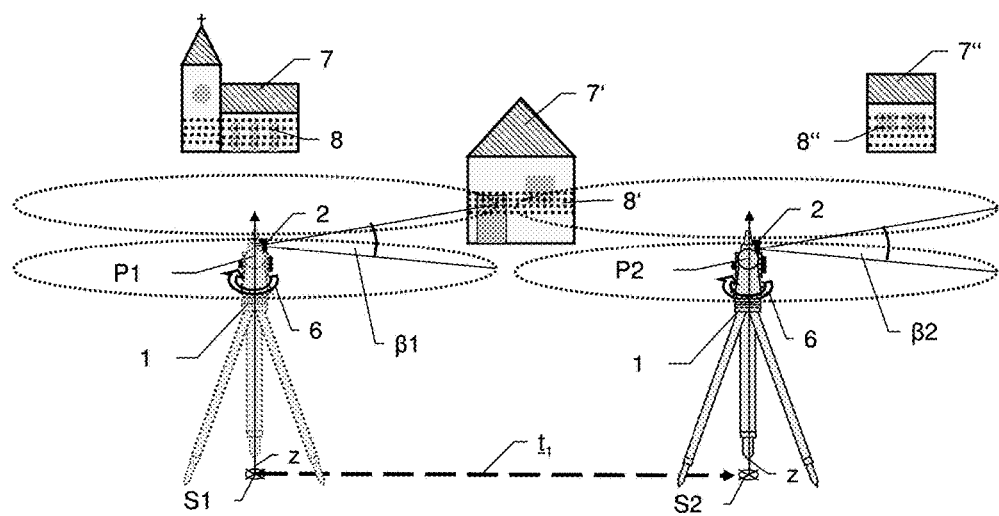

The method according to the invention is not restricted to specific field of view or viewing angle dimensions. FIG. 3b shows a geodetic surveying device 1, e.g. a theodolite, in a first deployment S1 and in a second deployment S2 offset therefrom in terms of position and orientation. By way of example, geodetic surveying of the environment objects 7, 7' and 7" is to be carried out, with it not being possible to sight all points to be surveyed from the first deployment S1 (for example because the object 7' covers the object 7"), which is why, after completion of the surveying, the theodolite is displaced from the first deployment S1 to the second deployment S2 in order to survey further or missing points of the objects 7, 7' and 7" from there. Here, the position P1 and the orientation O1 are determined precisely according to a method known to a person skilled in the art.

So that is not necessary also to determine the current position P2 and orientation O2 using such a time-consuming method according to the prior art, the method according to the invention is implemented. To this end, according to the invention, a first and a second image of the environment are recorded, respectively in the first and second deployment S1 and S2, by the unit 2, which is rotated through 360° (arrow 6) in the horizontal (i.e. in relation to the xy-plane) direction in the case of a vertical (i.e. in relation to the xz-plane) viewing angle β1 or β2 (aperture angle of the viewing cone of the unit 2) such that a panorama image is respectively generated as an image of the environment. Depending on the unit 2, the image is a two-dimensional panorama image or a three-dimensional range-panorama image. In each case, that region of the measurement environment that is situated in the viewing cone rotating about the z-axis is imaged. Hence, there generally is a relatively large overlap between the first region and the second region in the case of such 360° recordings, especially under the preconditions of a relatively small offset between the two positions P1 and P2 in the z-direction and large viewing angles β1 and β2. A multiplicity of common measurement environment points 8, 8' and 8" of the environment objects 7, 7' and 7" emerge.

Compared to the example according to FIG. 3a, even fewer requirements are placed on setting up the surveying device 1 in the second deployment S2 in the example according to FIG. 3b, as any alignment in an xy-plane is dispensed with when recording panorama images. A user must merely set the level and vertical alignment of the surveying device 1 or of the unit 2 in such an approximate manner that partly identical regions of the environment are registered in the first and second panorama images of the environment, which can be implemented with higher or lower precision, depending on the size of the vertical viewing angle β1 and β2. In the case of a very large vertical viewing angle β1 or β2, the surveying device can be set up with virtually no precondition.

Figure 3C:
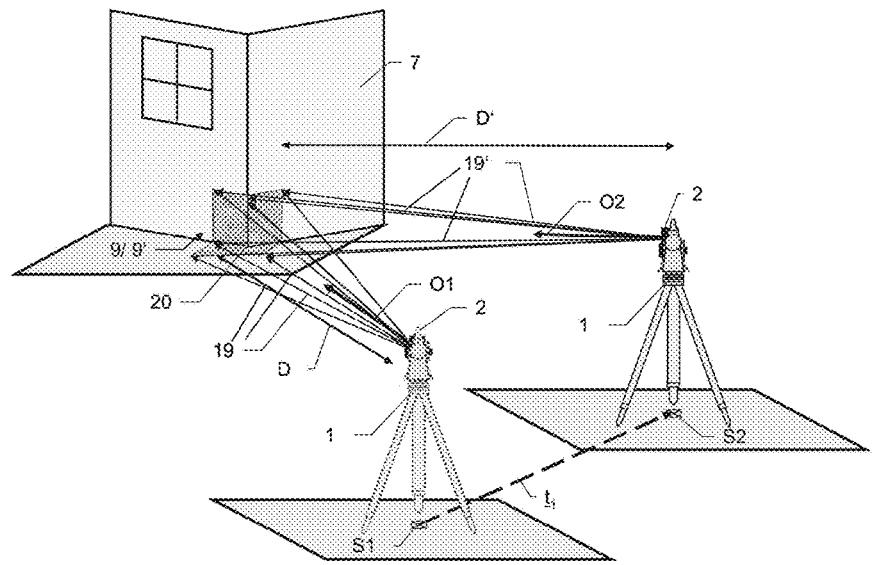

FIG. 3c shows a recording of images of the environment, in which, in contrast to the example according to FIG. 3b, only relatively small regions of the measurement environment are recorded. In the first deployment S1 with the first orientation O1, the surveying device 1 records a tightly delimited first region 9 around a corner 20 of a building as an object 7 in the measurement environment by means of the unit 2 for recording an image of the environment. From the second deployment S2 with the second orientation O2, the unit 2 likewise records the corner 20 of the building in a targeted manner such that the second region 9' is virtually identical to the first region 9. According to the invention, those tightly delimited regions of the environment 9 or 9', which have objects such as the building corner 20 that can easily be assigned an alignment in space, are particularly suitable therefor.

In the example, the unit 2 for recording an image of the environment is embodied as a laser scanning module. Accordingly, the distances (symbolized by arrows D and D') and directions 19 and 19' to the recorded measurement environment points of the regions 9 and 9' are determined in relation to the internal reference system of the surveying device 1 during the recording. Optionally, the intensity of the laser light reflected by the measurement environment points is registered here in order to increase the accuracy and/or reliability.

In contrast to the example according to FIG. 3b, a targeted recording of a tightly delimited contiguous region of the environment 9, 9' requires an approximate alignment of the surveying device 1, generally in all three spatial directions. According to the invention, this is implemented by an automatic specification and alignment, for the purposes of which information about the first contiguous region (location relative to the first position P1, alignment relative to the first orientation O1, extent) and about the precise first position P1 and orientation O1 and information about an approximate second position and orientation or an approximate position offset and orientation offset is available in the control and evaluation unit 50 such that the control unit can align the unit 2 with the measurement environment region to be imaged and, optionally, adapt the field of view FOV2 accordingly by way of motors that are inside the surveying device. Such information about an approximate position and orientation can be established, for example, by position and direction sensors or by registering known, registrable target points in the measurement environment. Alternatively, a relatively large region of the environment, in particular a panorama image, is recorded from the current deployment S2 in an additional step and the position and orientation are established approximately preferably using the first image of the environment by way of an image-based approximate determination of position and orientation, as is described, for example, in the patent application US 2013/0243250 A1. The second region 9' is specified on the basis of the approximate position offset and orientation offset or on the basis of the approximate current position and orientation and on the basis of a known position of the first region 9.

Figure 3D:
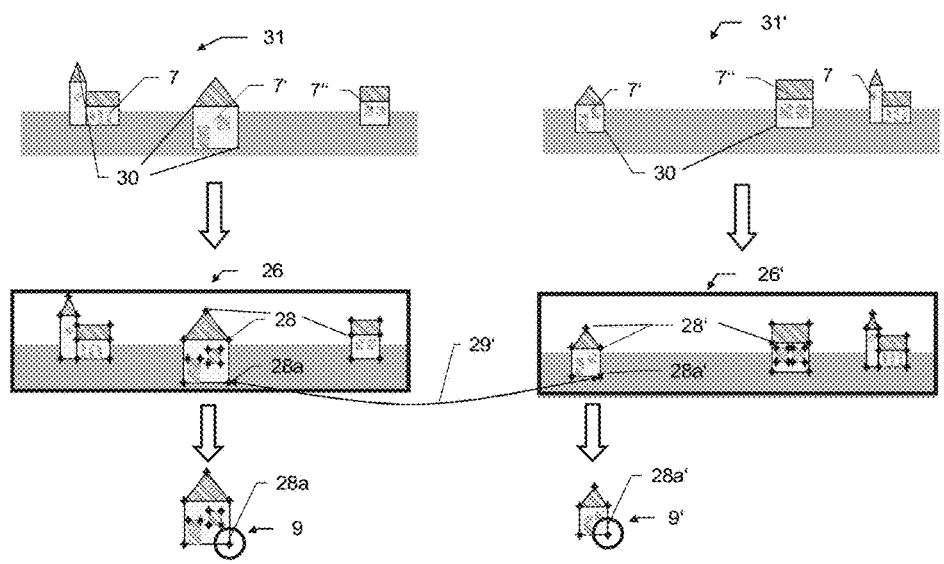

FIG. 3d shows an alternative method for automatic targeted specification of a tightly delimited region 9 or 9' of the measurement environment. Initially, use is made of large-scale regions 31 and 31' of the measurement environment. At the top left, a 360° view of the measurement environment is depicted as first region of the environment 31, as emerges from a first deployment S1 with a first orientation O1; at the top right, a 360° view of a second region of the environment 31' is depicted, as emerges from a second deployment S2 with a second orientation O2. It is possible in each case to identify three buildings as objects 7, 7' and 7", with building corners as being highlighted measurement environment points 30.

Figure 4A:
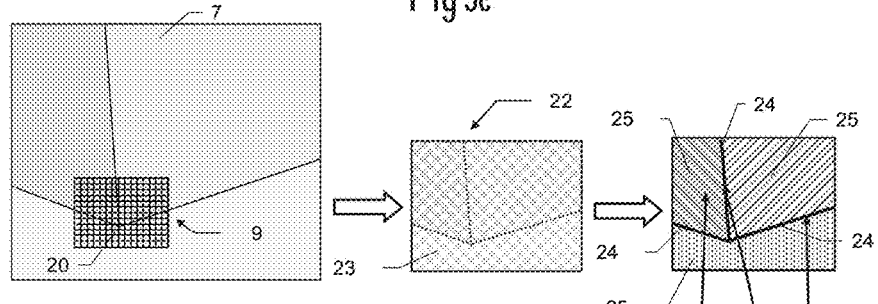
FIGS. 4a and 4b show examples of matching, according to the invention, of corresponding image elements of a first and a second image of the environment.
Figure 4A:
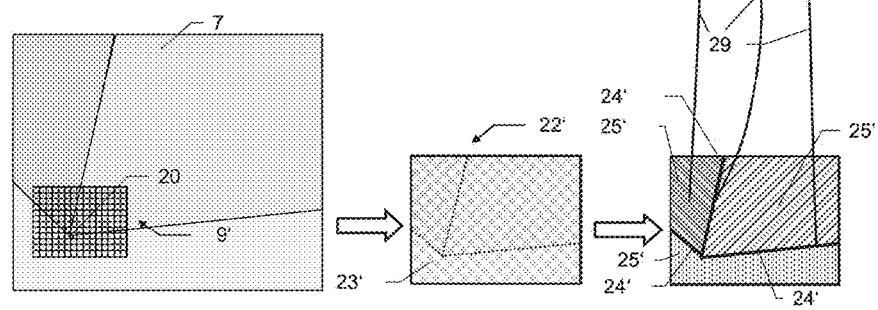
Figure 4B:
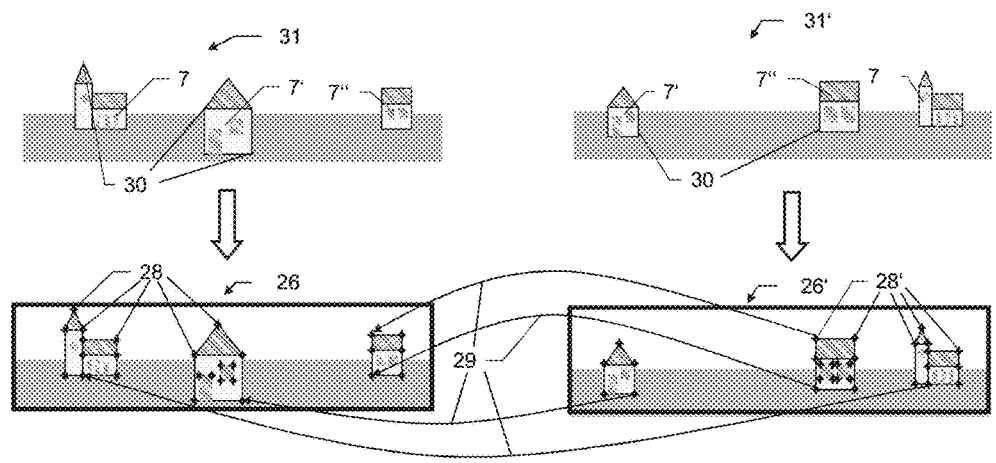

Panorama images 26 and 26', e.g. 360° scans, are generated from these large regions 31 and 31' (cf. FIG. 4b). Point features 28 and 28', such as e.g. geometric primitives or points with a particular brightness, are extracted from the images 26 and 26' by means of an image-processing algorithm; in the example, these are the corners of the buildings. At least one point feature 28a from the one image 26 is matched to the corresponding point feature 28a' of the other image 26' (arrow 29'). Subsequently, a first and second tightly delimited region 9 and 9' of the measurement environment is respectively specified on the basis of this one matched point feature 28a and 28a', which corresponds to a common highlighted measurement environment point 30. In the example, this is the location around one of the building corners situated at the ground. These small-scale regions 9 and 9' are then recorded in a targeted manner in further images of the environment 22 and 22' (cf. FIG. 4a), wherein these further images of the environment 22 and 22' preferably have a higher resolution than the panorama images 26 and 26'. For the remainder of the method, it is not the panorama images 26 and 26' which serve as first and second image of the environment but rather it is the further images of the environment 22 and 22' that are used as first and second image of the environment, offering advantages in respect of the precision as a result of the comparatively high resolution. Alternatively, a tightly delimited region 9' is only specified for the second deployment S2 and/or only the panorama image 26' recorded from the second deployment S2 is replaced by the further image of the environment 26' as second image of the environment for the remainder of the method.

Figure 3E:
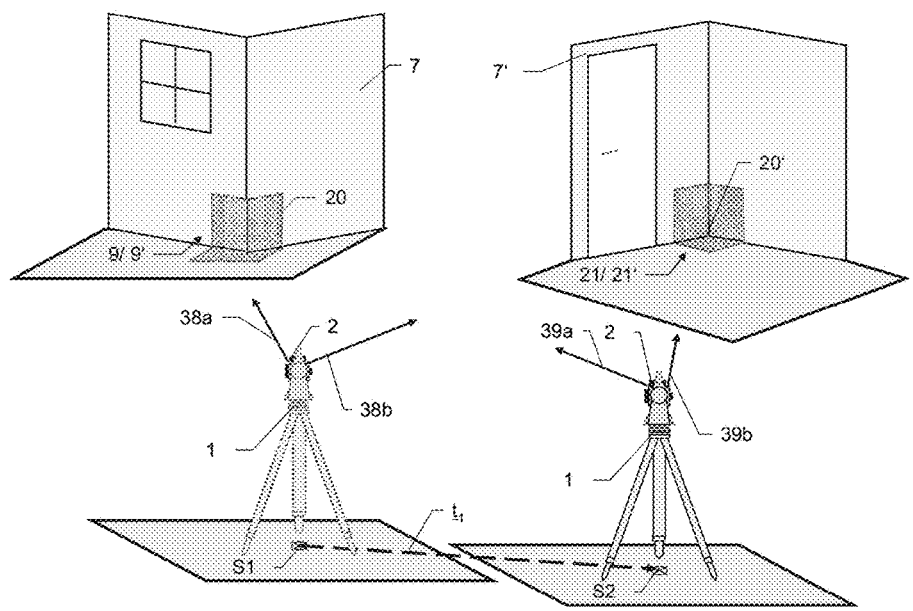

FIG. 3e shows a further example of recording images of the environment from a first deployment S1 and a second deployment S2. In the present case, it is not only a single tightly delimited contiguous region 9 or 9' that is recorded at an environment object 7 from the first or second deployment S1 and S2 in each case, but a further tightly delimited contiguous region 21 or 21' around a corner 20' of a further building as object 7' is also recorded in each case. Recording a plurality of regions 9 and 21 and also 9' and 21' is advantageous in view of the accuracy and robustness of determining the position offset and orientation offset. The first region 9 or 9' then in each case lies in a first recording direction 38a or 39a; the second region 21 or 21' lies in a second recording direction 38b or 39b. The first and second images of the environment are respectively composed from two individual recordings of the first and second regions 9 and 21 and also 9' and 21' or, alternatively, image zones corresponding to the first and the second regions 9 and 21 and also 9' and 21' are segmented from respectively one recording.

FIG. 4a shows a first example of the matching according to the invention (step 12 from FIGS. 2a and 2b) of corresponding image elements of a first image of the environment 22 and of a second image of the environment 22'. Depicted in the left-hand part of FIG. 4a is respectively a section of the measurement environment with part of a building as measurement environment object 7. The top left-hand part shows a view as emerges from the first deployment S1 from FIG. 3c; the lower portion shows a view as emerges from the second deployment S2 from FIG. 3c. The respectively recorded tightly delimited environment region 9 or 9' comprises the environment of the building corner 20 in a manner analogous to FIG. 3c. The tightly delimited regions of the environment 9 and 9' are specified in a targeted manner, for example as described in relation to FIG. 3d.

The first image of the environment 22, which emerges from recording the first region 9, is depicted at the top in the central images of FIG. 4a and the second image of the environment 22', which emerges from recording the second region 9', is depicted at the bottom. In the example, the images of the environment are generated by laser scans such that point clouds 23 and 23' are present.

In the example, image features which are extracted from both images 22 and 22' by means of an image-processing algorithm (right-hand part of FIG. 4a) serve as image elements. In the present case, geometric primitives (lines 24 and 24' and/or planes 25 and 25') are segmented. Features 24' and 25' of the image 22' are subsequently matched to the respectively corresponding features 24 and 25 of the image 22 (arrows 29). If a plurality of recorded regions 9/9' and 20/20' are present, as in the configuration according to FIG. 3d, the intersections of the lines 24 and 24' are alternatively extracted and matched as point features. Alternatively, matching is carried out without feature extraction by virtue of corresponding points of the point clouds 23' being matched to points of the point cloud 23.

FIG. 4b shows a second example of the matching according to the invention of corresponding image elements of a first image of the environment 26 and of a second image of the environment 26'. Depicted top left in FIG. 4b is a view of a first region of the environment 31, as emerges from a first deployment S1 with a first orientation O1, while a view of a second region of the environment 31', as emerges from a second deployment S2 with a second orientation O2 is depicted top right. In each case, it is possible to identify three buildings as objects 7, 7' and 7", with building corners as highlighted measurement environment points 30. In contrast to the regions 9 and 9' from the example according to FIG. 4a, the regions 31 and 31' are large scale and each comprise the environment of the measurement environment.

Depicted at the bottom of FIG. 4b are the first image 26 and the second image 26' of the first and second regions 31 and 31'. In contrast to the images 22 and 22' from the preceding figure, the images 26 and 26' are panorama photographs, produced using a digital camera as a unit 2, and so the relatively large contiguous regions 31 and 31' of the measurement environment are imaged. In the present example, point features 28 and 28' corresponding to the special measurement environment points 30 are extracted in the images 26 and 26' as image elements by means of an image-processing algorithm. Subsequently, corresponding point features 28 and 28' are matched in both images 26 and 26' (arrows 29).

Figure 5:
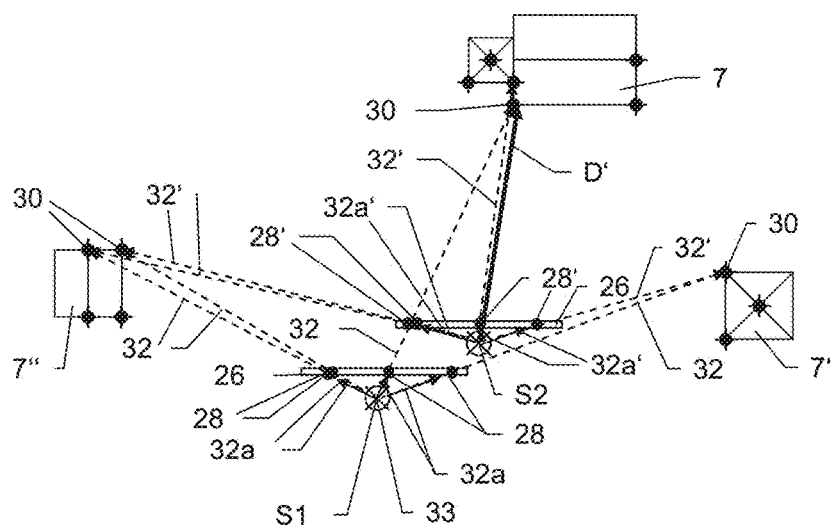
FIG. 5 shows an example of determining the position offset and orientation offset according to the invention on the basis of corresponding image elements.

FIG. 5 shows an example of the determination according to the invention of the position offset and orientation offset on the basis of corresponding image elements 28 and 28'. A situation corresponding to that according to FIG. 4b is depicted. From the bird's-eye view, it is possible to see the objects 7, 7' and 7" with the measurement environment points 30 and the two deployments S1 and S2 of the surveying device 1. In the images 26 and 26', the mutually corresponding point features 28 and 28' correspond to the measurement environment points 30. The unit 2 for recording an image of the environment has a projection center, the location 33 and 33' of which coincides with the zero point of the internal reference system of the surveying device 1 in the example. Respectively one direction (arrows 32a and 32a'),
which is the direction 32 and 32' from the respective zero point location to the respective measurement environment point 30, which is imaged by two corresponding image elements 28 and 28', is defined by the location 33 and 33' of the projection center and by the location of respectively one image element 28 and 28' in the first and second image 26 and 26'. Accordingly, with knowledge of the location of the projection center 33 and 33' of the image-recording unit 2, the directions 32 and 32' from the deployments S1 and S2 to all or some of those measurement environment points 30 which correspond to corresponding point features 28 and 28' are determined (step 13 from FIGS. 2a and 2b) according to known geometric principles, for example using a 7-point or 8-point algorithm, bundle adjustment or ICP algorithm on the basis of the location of the respective point feature 28 and 28' in the image 26 and 26'.

In order to determine the scaling factor (step 14 from FIGS. 2a and 2b), there is a contactless measurement of the distance (characterized by the arrow D') from the second deployment S2 to at least one of these measurement environment points; in the example, it is to the point 30 of the object 7. In the example, the contactless measurement is implemented using the laser rangefinding functionality of the surveying device 1 with the aid of the angle measurement functionality thereof. The position offset ΔP and the orientation offset ΔO between the first deployment S1 and the second deployment S2 are subsequently determined according to known geometric principles on the basis of the directions 32 and 32' and the at least one distance (arrow D'), in a manner analogous in principle to a backward cut, with an accuracy in the sub-centimeter range being achieved.

If images of the environment 22 and 22' from point clouds 23 and 23' are present (see FIG. 4a), the directions are determined on the basis of the location of an image element 24 or 24' and/or 25 or 25' in the image 22 or 22' and at least one distance (arrow D') is measured to image elements 24 or 24' and/or 25 or 25' which have not been separately matched. The directions and distances to all imaged measurement environment points are already available with the generation of the point cloud 23 and 23', that is to say also to those measurement environment points 30 which are used for determining the position offset ΔP and the orientation offset ΔO because these are imaged as corresponding image elements or as parts of corresponding image features. If a more precise measurement of the distance D' is possible using the rangefinding functionality of the surveying device 1 than by way of a laser optical measurement using the laser scanning module (unit 2), there alternatively is, in a manner analogous to the example above, a laser-optical measurement of the distance D' to at least one matched image element 24 or 24' and/or 25 or 25' on the basis of the rangefinding functionality of the surveying device 1 in order to further increase the accuracy. Alternatively, a new and optionally targeted small-scale measurement with a higher measurement accuracy/resolution than when the point cloud 23' is generated is carried out using the laser scanning module for determining the distance D'.

Figure 6:
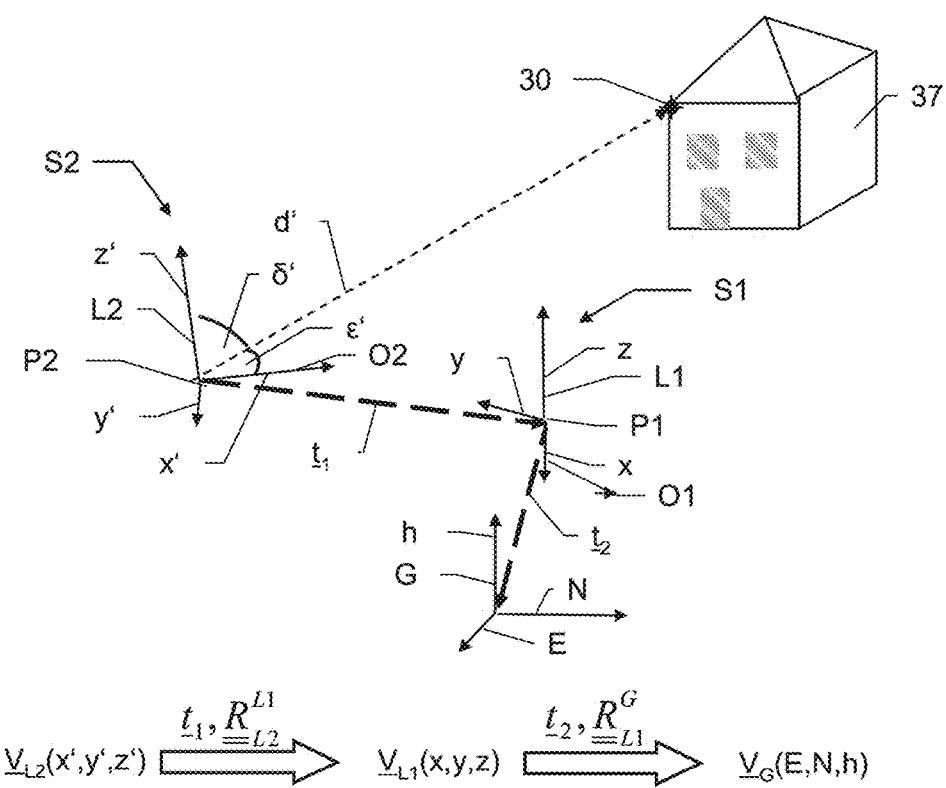
FIG. 6 shows an example of the transformation according to the invention of the location data of a measurement environment point from the second deployment to the first.

FIG. 6 is an example of the transformation of location data of a measurement environment point 30 from the second deployment S2 to the first deployment S1. By the determination according to the invention of the position offset and the orientation offset ΔP and ΔO, the transformation parameters (translation vector $\underline{t}_1$ and rotation matrix $\underline{R}_{L2}^{L1}$) between the first local reference system L1 with the axes x, y, z and the second local reference system L2 with the axes x', y', z' or between the first and the second deployment S1 and S2 are known or determinable. The orientation O1 or O2 respectively corresponds to the x-axis or x'-axis. Using the transformation parameters, it is possible to transfer the position data $\underline{V}_{L2}$ of a measurement environment point 30, which are determined from the second deployment S2 and hence in relation to the second reference system L2 with the zero point P2, to the first deployment S1, such that they are available as position data $\underline{V}_{L1}$ in the first reference system L1 with the zero point P1.

The position data $\underline{V}_{L2}$ from the coordinates x', y', z' are determined by the rangefinding and angle measurement functionality of the surveying device 1 by way of a measurement of a distance d' and two angles δ' and ε'. The position data $\underline{V}_{L1}$ of the coordinates x, y, z are calculated using the translation vector $\underline{t}_1$ and the rotation matrix $\underline{R}_{L2}{}^{L1}$, which are determined on the basis of the directions 19 and 19' or 32 and 32' and the measured distance D': $\underline{V}_{L1} = \underline{R}_{L2}{}^{L1} \cdot \underline{V}_{L2} + \underline{t}_1$. Therefore, by way of the method according to the invention, the spatial location of a measurement environment point 30, which is surveyed from the deployment S2, is determined in relation to the first deployment S1.

If, furthermore, the first reference system L1 is geo-referenced, which means that transformation parameters are known from a translation vector $\underline{t}_2$ and a rotation matrix $\underline{R}_{L1}{}^{G}$ which enable a transformation of the first reference system L1 to an absolute, external reference system G with the axes N (North), E (East), h (height), the position data $\underline{V}_{L1}$ are transformed into the position data $\underline{V}_G$ from the coordinates E, N, h in the external reference system G in one development of the method according to the invention: $\underline{V}_G = \underline{R}_{L1}{}^{G} \cdot \underline{V}_{L1} + \underline{t}_2$. If the surveying device 1 is aligned with the external reference system in the first deployment S1 and positioned in such a way that the xy-plane extends exactly parallel to the ground plane (EN plane), the transformation from the first reference system L1 to the reference system G simplifies into a translation in the z-direction or h-direction. Thus, the specification of the spatial location of a measurement environment point 30, which is measured from the deployment S2, is carried out in relation to an external, absolute reference system G by way of the method according to the invention, and so the measured position data of a measurement environment point 30 are geo-referenced.

What is claimed is:

1. A method for precisely determining the position offset and orientation offset of a second deployment, defined by a second position and a second orientation, in relation to a first deployment, defined by a first position and a first orientation, of a geodetic surveying device having a laser rangefinding functionality and an angle measurement functionality, wherein the first deployment and the second deployment are situated in the same measurement environment, comprising the following steps:

recording with the geodetic surveying device a second image of the environment of at least a second contiguous region of the measurement environment from the second deployment, matching image elements of the second image of the environment to corresponding image elements of a first image of the environment, which was recorded from the first deployment and images at least one first contiguous region of the measurement environment, wherein the first and the second contiguous regions have a multiplicity of common measurement environment points, determining, in the internal reference system of the geodetic surveying device, the directions respectively from the first and second deployments to a measurement environment points which correspond to corresponding image elements on the basis of the location of the respective image element in the respective image of the environment, determining a scaling factor, precisely determining the position offset and the orientation offset on the basis of the determined directions and the scaling factor.

2. The method according to claim 1, wherein:

a scaling factor is determined by means of a precise, contactless, measurement of the distance from the second deployment to at least one measurement environment point whose direction has been determined, wherein the precise contactless measurement of the distance is brought about automatically, wherein the geodetic surveying device is automatically aligned on the measurement environment point to be measured on the basis of the determined direction, or by means of an object with known dimensions imaged in the first and/or second image of the environment.

3. The method according to claim 1, wherein:

the first position and the first orientation are determined precisely in relation to an external reference system.

4. The method according to claim 1, wherein:

the first position and the first orientation are precisely geo-referenced.

5. The method according to claim 1, wherein:

the position offset and the orientation offset are determined in relation to all six degrees of freedom.

6. The method according to claim 1, wherein:

recording a further image of the environment of at least one further contiguous region of the measurement environment from the second deployment, wherein the further contiguous region is specified on the basis of image features which are extracted from the first and/or the second image of the environment, wherein the further image of the environment has a higher resolution than the second image of the environment, and performing the following method steps:

matching image elements, determining the directions, determining a scaling factor and precisely determining the position offset and the orientation offset using the further image of the environment as second image of the environment.

7. The method according to claim 1, wherein:

an image of the environment is recorded by registering the reflected laser light intensity, wherein measurement environment points recorded in the process cover the respective contiguous region of the measurement environment with a predetermined minimum density and/or in relation to a recording direction.

8. The method according to claim 1, wherein:

an image of the environment is recorded by photography or laser scanning, wherein measurement environment points recorded in the process cover the respective contiguous region of the measurement environment with a predetermined minimum density and/or in relation to a recording direction.

9. The method according to claim 8, wherein:

the recording direction is horizontal relative to an external absolute reference system over an angle of at least 1.5°.

10. The method according to claim 8, wherein:

the recording direction is horizontal relative to an external absolute reference system over an angle of at least 45°.

11. The method according to claim 8, wherein:
the recording direction is horizontal relative to an external absolute reference system over an angle of at least 360°.

12. The method according to claim 8, wherein:
the recording direction is horizontal relative to an external absolute reference system as a result of which a panorama image, a panorama 3D scan or a range panorama image is generated as image of the environment.

13. The method according to claim 1, wherein:
image elements are individual image points, or image elements are image features, which are extracted from the images of the environment using image processing, wherein image features are represented by geometric primitives and/or descriptors.

14. The method according to claim 13, wherein:
image elements are pixels or 3D points of the images of the environment.

15. The method according to claim 13, wherein:
the image processing includes edge-based and/or region-based segmentation.

16. The method according to claim 1, wherein:
matching of image elements is brought about by means of:
  an iterative matching algorithm, or
  a dense matching algorithm, or
  a sum of squared differences or least squares algorithm, or
  a feature-based algorithm.

17. The method according to claim 16, wherein:
the iterative matching algorithm comprises an iterative closest-point algorithm.

18. The method according to claim 16, wherein:
the dense matching algorithm comprises an semi-global matching algorithm.

19. The method according to claim 16, wherein:
the feature-based algorithm is performed on the basis of a scale invariant feature transform algorithm and/or a speeded-up robust features algorithm.

20. The method according to claim 1, wherein:
position data of the measured measurement environment points, which are determined by means of the laser rangefinding functionality and angle measurement functionality from the second deployment, are transformed on the basis of the determined position offset and orientation offset in such a way that the positions of the measured measurement environment points are available relative to the first position and first orientation.

21. The method according to claim 1, wherein:
an automatic targeted specification of the second and/or first contiguous region on the basis of approximate position and orientation information.

22. The method according to claim 1, wherein:
the position offset and orientation offset are determined so precisely that the second position and the second orientation are determinable with geodetic accuracy.

23. The method according to claim 1, wherein:
transferring the data of the environment images or the image elements and performing method steps are performed externally of the surveying device on a smartphone or by way of cloud services.

24. A geodetic surveying device, comprising
a structure, which is arranged on a base and swivelable about a swivel axis,
a sighting unit, wherein the sighting unit has at least one emission unit, defining an optical target axis, for emitting a laser beam and a rangefinding functionality for precisely measuring a distance to an object,
an angle measurement functionality for precisely registering at least one swivel angle defined by a relative swivel position of the structure relative to the base and
a control and evaluation unit,
a unit for recording an environment image, wherein:
  the control and evaluation unit is embodied in such a way that the method according to claim 1 is implementable therewith.

25. A non-transitory computer program product, stored on a machine-readable medium, comprising program code suitable to determine the position offset and orientation offset of the geodetic surveying device from a recorded image of the environment of a geodetic surveying device according to the method according to claim 1.

* * * * *